3,280,073
POLYSILYLBENZENE COMPOUNDS
Roger G. Chaffee, Midland, Mich., assignor to Dow Corning Corporation, Midland, Mich., a corporation of Michigan
No Drawing. Filed Dec. 10, 1964, Ser. No. 417,466
21 Claims. (Cl. 260—46.5)

This invention relates to polysilylbenzene monomers, methods for their production, and to polysilylbenzene siloxane polymers and copolymers and methods for their production. This application is a continuation-in-part of applicant's copending application Serial No. 189,279, filed April 23, 1962, now abandoned. This application was in turn a continuation-in-part of and copending with application Serial No. 135,783, filed September 5, 1961, now abandoned.

All of the compounds of this invention are characterized by having three or more silicon atoms attached to a single benzene radical (e.g., $C_6H_3\equiv$). The polysilylbenzene monomers of this invention have at least one reactive group in each molecule. The term "polysilylbenzene monomers" includes silcarbane monomers, salts thereof, and silanols. The polysilylbenzene siloxane polymers and copolymers are produced from these monomers.

It is an object of the present invention to prepare novel reactive polysilylbenzene monomers and to provide techniques for their preparation by which commercially practical yields are obtained. It is a further object to prepare novel polymers and copolymers from these reactive monomers. Another object is to prepare silylbenzene compounds which are useful as molding resins and which are useful as crosslinking units in siloxane and silylarylene polymers and silylarylenesiloxane copolymers. Other objects and advantages will be apparent from the following description.

The polysilylbenzene monomers of this invention are those of the formula $R_nC_6H_{(6-m-n)}(SiR'R''_2)_m$, wherein R is an alkoxy radical of from 1 to 3 carbon atoms, $n$ has a value of 0 to 1, R' is selected from the group consisting of hydrogen atoms and monovalent hydrocarbon, alkoxy, hydroxyl and —OM radicals, wherein M is selected from the group consisting of $NH_4^+$ ions and alkali metal atoms, R'' is selected from the group consisting of monovalent hydrocarbon, alkoxy, hydroxyl and —OM radicals, and $m$ has a value of 3 to 6, an average of at least one R' and R'' group per molecule being selected from the group consisting of alkoxy, vinyl, hydroxyl, and —OM radicals, and hydrogen atoms.

The polysilylbenzene siloxane polymers of this invention are of the formula

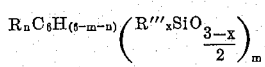

wherein R is an alkoxy radical of from 1 to 3 carbon atoms, $n$ has a value of 0 to 1, $x$ has a value of from 1 to 2, R''' is a monovalent hydrocarbon radical, and $m$ has a value of 3 to 6.

The R', R'' and R''' radicals in the above compounds can be any monovalent hydrocarbon radicals. The R'' and R''' radicals can be the same or different from one another. Suitable R', R'' and R''' radicals include alkyl radicals, such as methyl, ethyl, butyl and octadecyl; alkenyl radicals, such as vinyl, allyl and butadienyl; cycloalkyl groups, such as cyclobutyl, cyclopentyl and cyclohexyl; cycloalkenyl groups, such as cyclopentenyl and cyclohexenyl; aryl groups, such as phenyl, xenyl and naphthyl; aralkyl groups, such as benzyl; alkaryl radicals, such as tolyl and xylyl. Methyl, ethyl and phenyl radicals are preferred.

R' and R'' can also be an alkoxy or hydroxyl radical. Suitable examples of alkoxy radicals are methoxy, ethoxy, isopropoxy and butoxy. R' and R'' can also be an —OM radical, wherein M is either an alkali metal or $NH_4^+$ ion. Suitable —OM radicals are —OH$a$, —OC$s$, OC$a$, —OL$i$, —OR$b$ and —ONH$_4^+$. R' can also be a hydrogen atom. It is essential in the monomers that there be at least one reactive group per molecule (i.e., alkoxy, —OM, vinyl, hydroxyl radicals and hydrogen atoms). If no reactive groups are present in the monomers, then it is not possible to make the polysilylbenzene siloxane polymers of this invention. The monomers with one reactive group per molecule can be used to endblock the polymers of this invention. There can be no more than three total alkoxy, vinyl, hydroxyl and —OM radicals and hydrogen atoms per silicon atom and no more than one hydrogen atom per silicon atom in the monomer. The hydroxyl and alkoxy radicals are eliminated in the formation of the polymer from the monomer.

R in the above compounds is an alkoxy radical of from 1 to 3 carbon atoms. Thus, R can be a methoxy, ethoxy, propoxy, or isopropoxy radical.

The polysilylbenzenes of this invention (i.e.,

can be prepared in good yield by means of an "in situ Grignard" technique. In this technique, no attempt is made to prepare a Grignard reagent separately or as such. This method comprises reacting (1) a benzene polyhalide of the formula $R_nC_6H_{(6-m-n)}(X)_m$, wherein X is a halogen atom selected from the group consisting of chlorine and bromine, and R is an alkoxy radical of from 1 to 3 carbon atoms, $n$ has a value of 0 to 1, and $m$ has a value of 3 to 6, with (2) magnesium, and (3) a silane of the formula $YZ_2SiX$, wherein Y is selected from the group consisting of monovalent hydrocarbon and alkoxy radicals, and hydrogen atoms, and Z is selected from the group consisting of monovalent hydrocarbon and alkoxy radicals, an average of at least one Z and Y group per molecule being selected from the group consisting of alkoxy and vinyl radicals and hydrogen atoms per molecule, and X is as above defined, by adding (1) to the magnesium in the presence of an amount of (3) which is at least equivalent to the amount of (1).

In the preparation of the polysilylbenzenes, either of two slightly different, but related methods can be used. In the first method, a mixture of the halosilane, $YZ_2SiX$, and the benzene polyhalide, $R_nC_6H_{(6-m-n)}(X)_m$, is prepared, and this mixture is added directly to magnesium under conditions which are otherwise the conventional conditions for preparing Grignard reagents. The magnesium, is of course, employed in a form which provides a high surface area, i.e., in the form of chips, granules, powder or the like. Although not absolutely necessary, it is preferable that an inert solvent be present in order to provide maximum contact and handling ease. Conventional Grignard solvents can be employed for this purpose, as illustrated by ethers such as diethyl ether or any other relatively anhydrous solvent of the type which does not itself react with Grignard reagents. Solvents which may theoretically form Grignard complexes are considered inert under the meaning of that term intended here, for they do not destroy the reactivity of the reagent. Of course, more than one solvent can be used, if desired.

By far, the most preferred solvent for the above reaction is tetrahydrofuran, and under most conditions this solvent consistently produces the best yield of product.

As is well known in Grignard type preparations, the optimum conditions will vary with the particular benzene polyhalide employed and with the stage of the reaction. In other words, it may require a somewhat elevated temperature to initiate a reaction, but once the reaction has begun it will be found to continue at a rapid pace under practically any conditions wherein the reactants other than the magnesium are in a liquid phase. If desired, the conventional trace of iodine or a highly reactive halide, such as methyl bromide, can be added to the magnesium at the very beginning of the reaction in order to activate the system. Once the reaction is initiated, it can ordinarily be controlled by controlling the rate of addition of the reactants to the magnesium, but external cooling can be applied, if desired, to permit a rapid rate of addition. Ordinarily, it will be preferable to carry out the reaction at temperatures ranging from 25° to 150° C., and atmospheric or superatmospheric pressures can be used as desired.

The silane, $YZ_2SiX$, should be present during the reaction in an amount at least equivalent to the amount of benzenepolyhalide present ($m$ mols of the silane being equivalent to one mol of benzenepolyhalide, $m$ being defined above). Preferably, the silane is present in a 10 to 100 percent excess of the equivalent amount. Any amount of magnesium can be used, but for efficiency, it is preferred that it also be present in an amount at least equivalent to the total benzenepolyhalide to be used (i.e., $m$ g. atoms of Mg per mol of benzenepolyhalide).

In the second type of process for the preparation of the defined silanes, the reaction conditions are the same as discussed above. This second technique, however, is characterized by the fact that the magnesium is mixed with a halosilane reactant and the benzenepolyhalide is added to the mixture so prepared. If an inert solvent is used, it can be mixed with either the halosilane or the benzenepolyhalide, or both.

The polysilylbenzenes which contain silicon-bonded hydrogen atoms can be converted to corresponding alkoxysilanes by reacting them with the appropriate alcohol in the presence of a catalytic quantity (preferably 0.01 to 1 weight percent based on the weight of the polysilylbenzene) of metallic sodium. Conventional techniques can be used for this alcoholysis. Alcohols of from 1 to 5 inclusive carbon atoms and reaction temperatures of about 50 to 150° C. are preferred. It is best to use an amount of alcohol at least equivalent to the silicon-bonded hydrogen and preferably an excess is present. The various alkoxysilanes can also be prepared by using the proper alkoxyhalogenosilane in the "in situ Grignard" reaction.

The alkoxy groups of the above product can be converted to the corresponding salts (the —OM groups) by hydrolysis with water in the presence of either an alkali metal hydroxide or ammonium hydroxide. In using the alkali metal hydroxide or ammonium hydroxide, the preferred technique is the same as that shown immediately below.

Silanols can be prepared from these salts by neutralization of the salt with an acid such as potassium acid phosphate.

Silanol-containing compounds can be prepared directly from the SiH containing silanes of this invention without isolating the intermediate alkoxy-containing materials and salts from the reaction mass by hydrolyzing the SiH containing silane with a relatively strong solution of an alkali metal hydroxide (preferably NaOH or KOH) or ammonium hydroxide in alcohol and water, followed by neutralization of the reaction product. The reaction takes place at room temperature. The concentration of the alkali metal hydroxide or ammonium hydroxide should be at least 5 percent by weight, and about 7 to 15 percent is preferable. Aliphatic alcohols of from 1 to 3 inclusive carbon atoms give the best results. The ratio of alcohol to water is not critical, but should ordinarily range from about 9:1 to 1:9. The amount of solution employed is preferably sufficient to provide at least an equivalent of the alkali metal hydroxide or ammonium hydroxide (i.e., $m$ mols per mol of

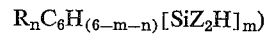

along with an excess of both water and alcohol. Neutralization is best accomplished with a water soluble acid or acid salt, e.g., acetic acid or potassium acid phosphate.

The silanol products discussed above can be polymerized to polysilylbenzenesiloxane polymers by heating them in the presence of catalytic quantities of alkali metal hydroxides, as has been described in U.S. Patent No. 2,562,000, issued July 24, 1951, which is incorporated herein by reference. Preferred catalysts for such a polymerization are the mine salts of carboxylic acids as described in the copending Hyde application Serial No. 826,421, filed July 13, 1959, now Patent No. 3,160,601, which is incorporated herein by reference. The polysilylbenzenesiloxane polymers can be prepared directly from the alkoxysilanes of this invention without isolating the intermediate silanols and salts.

The polysilylbenzenes which contain no reactive groups other than vinyl can be polymerized by reacting these compounds with compounds containing silicon-bonded hydrogen groups (e.g., methylhydrogensiloxane), thereby obtaining SiH addition across the double bond of the vinyl group. This technique is a conventional method of polymerizing vinyl-containing silicon compounds.

The polymers prepared by the polymerization of either the polysilylbenzene silanols or the vinyl-containing polysilylbenzenes are highly cross-linked polymers. These polymers are useful as molding resins.

This invention also relates to an organosiloxane copolymer consisting essentially of (1) units of the formula

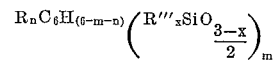

wherein R is an alkoxy radical of from 1 to 3 carbon atoms, $n$ has a value of 0 to 1, $x$ has a value of from 1 to 2, R''' is a monovalent hydrocarbon radical, and $m$ has a value of 3 to 6, and (2) units selected from the group consisting of (A)

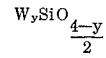

wherein W is selected from the group consisting of monovalent hydrocarbon radicals and halogenated monovalent hydrocarbon radicals and $y$ has a value of from 1 to 2, (B) —Si(W')$_2$W''(W')$_2$SiO—, wherein each W' is a monovalent hydrocarbon radical and W'' is a divalent radical selected from the group consisting of p-phenylene, 4,4'-biphenylene, 4,4'-diphenylene ether, 4,4'-p-xylylene, and 4,4'-dimethylenediphenyl ether radicals, and (C) both (A) and (B) polymeric units, said polymeric units being bonded together through SiOSi linkages.

The

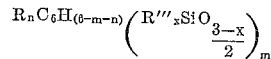

units are as described previously. These units can be copolymerized with conventional linear siloxanes, such as the well known polymeric and cyclic forms of siloxanes to produce copolymers containing

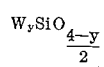

units. W can be any monovalent hydrocarbon radicals,

Specific examples of these radicals have been set forth above. The W group can also be any of these radicals with halogen atoms attached thereto, e.g., chloromethyl, bromophenyl, trifluorotolyl, $CF_3CH_2CH_2$ and $$C_3F_7CH_2CH_2$$

The subscript $y$ has a value of from 1 to 2. Hence these materials can range from highly crosslinked resins to linear gums. These copolymers can contain only one species of $$W_y SiO_{\frac{4-y}{2}}$$

units or can contain different species of these units. Obviously, not all of the W groups attached to each silicon atom need be the same. The preferred $$W_y SiO_{\frac{4-y}{2}}$$

units are dimethylsiloxy, diphenylsiloxy, methylphenylsiloxy, and monophenylsiloxy units. The techniques and catalysts used to produce the polysilylbenzene homopolymers can also be used to produce these copolymers.

The polysilylbenzene compounds can be copolymerized with silarylenesilane diols to produce copolymers containing $Si(W')_2W''(W')_2SiO$ units. W' can be any monovalent hydrocarbon radical (as described above). These diol units can be depicted by the following respective structural formulae:

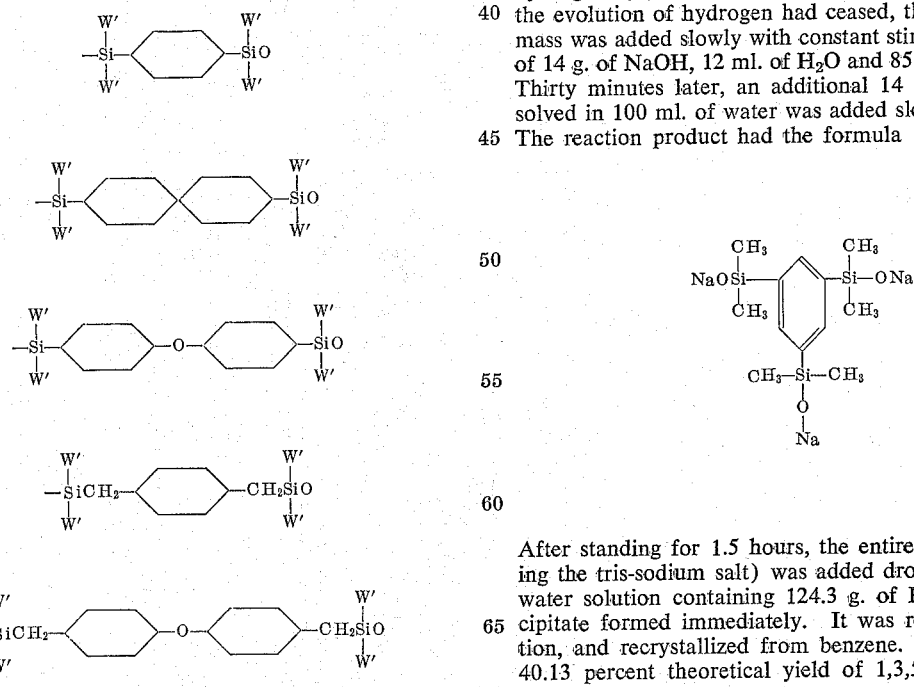

Silylarylenesilane diols useful for producing these copolymers are described in the copending Merker application (Serial No. 44,534, filed July 22, 1960, now U.S. Patent No. 3,209,018), which is incorporated herein by reference.

Polysilylbenzene polyols can be copolymerized with both silarylenesilane diols and conventional siloxanols. Silarylenesiloxane copolymers are disclosed in the copending Merker application 44,534. Silarylenesiloxane block copolymers are disclosed in the copending Merker application (Serial No. 51,594, filed August 24, 1960, now U.S. Patent No. 3,202,634), which is incorporated herein by reference. The polymerization catalysts and techniques disclosed in that application can be used to produce the copolymers containing silarylene units.

These copolymers can be fabricated by the usual techniques into organosilicon rubbers and resins. The degree of crosslinking present in these copolymers can be varied by varying the amount of polysilylbenzene units present.

The following examples are illustrative only and should not be construed as limiting the invention which is properly delineated in the appended claims. All parts are parts by weight unless otherwise indicated.

*Example 1*

A solution of 102.9 g. (0.327 mol) of 1,3,5-tribromobenzene in 475 ml. of tetrahydrofuran was added slowly to a mixture of 123.7 g. (1.3 mols) of dimethylchlorosilane and 39 g. (1.6 mols) of purified magnesium turnings and 110 ml. of tetrahydrofuran. The reaction was exothermic. When the addition was complete, the reaction mixture was stirred and heated for an additional 20 hours. After cooling, 750 ml. of n-hexane was added and the magnesium solids were removed by filtration. 500 ml. of benzene was added to the liquid portion before washing with water. The solvent was then removed by distillation. Vacuum distillation provided the compound 1,3,5-tris(dimethylhydrogensilyl)benzene in a yield of 40.5 percent of theoretical.

The alkoxysilane, 1,3,5-(dimethylethoxysilyl)benzene, was prepared by heating a mixture of 150 ml. of absolute ethanol and a small piece of metallic sodium at reflux temperature while 18 g. (0.0714 mol) of 1,3,5-tris(dimethylhydrogensilyl)benzene was slowly added thereto. When the evolution of hydrogen had ceased, the entire reaction mass was added slowly with constant stirring to a mixture of 14 g. of NaOH, 12 ml. of $H_2O$ and 85 ml. of methanol. Thirty minutes later, an additional 14 g. of NaOH dissolved in 100 ml. of water was added slowly to the mass. The reaction product had the formula

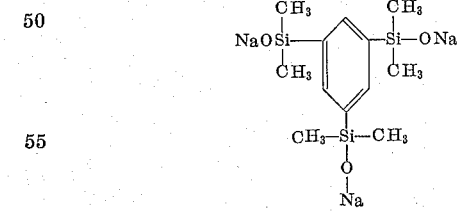

After standing for 1.5 hours, the entire mixture (including the tris-sodium salt) was added dropwise into an ice water solution containing 124.3 g. of $KH_2PO_4$. A precipitate formed immediately. It was removed by filtration, and recrystallized from benzene. This provided a 40.13 percent theoretical yield of 1,3,5-tris(dimethylhydroxysilyl)benzene.

A solution of eight drops of tetramethylguanidine-2-ethylhexoate in 300 ml. of benzene was added to 26 g. of 1,3,5-tris(dimethylhydroxysilyl)benzene was added at 80° C. under reflux while water was removed by way of azeotrope trap. Refluxing was continued for about 24 hours to remove the theoretical quantity of water from the system. The benzene was evaporated from the solution and the residue was heated at 250° C. for one hour to produce a tough, resinous, polymeric siloxane of the unit formula

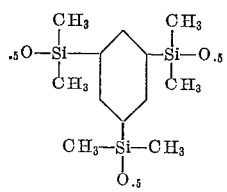

Example 2

A solution of 100.9 g. (0.32 mol) of 1,3,5-tribomobenzene in 500 ml. of tetrahydrofuran was slowly added to a mixture of 261.3 g. (1.2 mols) of diphenylchlorosilane, 37.1 g. (1.53 mols) of magnesium and 200 ml. of tetrahydrofuran. The reaction was exothermic. After the addition was complete, the reaction mass was heated at reflux temperature for two hours and then cooled to 50° C. The magnesium solids were removed by filtration. The organic layer was washed with water and the solvent allowed to evaporate.

Strip distillation provided the compound 1,3,5-tris(diphenylhydrogensilyl)benzene in a 35.5 percent yield of theoretical.

The alkoxysilane, 1,3,5-tris(diphenylethoxysilyl)benzene was prepared by heating a mixture of 200 ml. of absolute ethanol and a small piece of metallic sodium at reflux temperature while 29 g. of 1,3,5-tris(diphenylhydrogensilyl)benzene was added slowly thereto. When the evolution of hydrogen had ceased, the crude reaction product was poured with constant stirring into a solution of 22 g. of NaOH, 20 ml. of $H_2O$ and 140 ml. of methanol. A solution of 22 g. of NaOH dissolved in 160 ml. of methanol was added to the mass and stirred for one hour and then allowed to stand for one hour. The reaction product had the formula

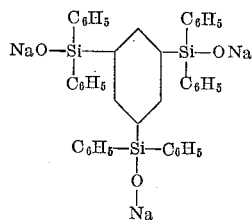

The entire mixture (including the tris-sodium salt) was added slowly into an ice water solution containing 196 g. of $KH_2PO_4$. A precipitate formed immediately and was removed by filtration. The product obtained was 1,3,5-tris(diphenylhydroxysilyl)benzene which was obtained in an 86.5 percent yield.

The following tris-salts are formed when the following hydroxides are substituted at the same mol ratio for the NaOH used above:

| Hydroxide | Tris-salts |
|---|---|
| 1. KOH | $C_6H_5$ / $C_6H_5$ / KO—Si—〈 〉—Si—OK / $C_6H_5$ / $C_6H_5$ / $C_6H_5$—SiC$_6H_5$ / O / K |
| 2. CsOH | $C_6H_5$ / $C_6H_5$ / CsO—Si—〈 〉—Si—OCs / $C_6H_5$ / $C_6H_5$ / $C_6H_5$—SiC$_6H_5$ / O / Cs |
| 3. LiOH | $C_6H_5$ / $C_6H_5$ / LiO—Si—〈 〉—Si—OLi / $C_6H_5$ / $C_6H_5$ / $C_6H_5$—Si—$C_6H_5$ / O / Li |
| 4. RbOH | $C_6H_5$ / $C_6H_5$ / RbO—Si—〈 〉—Si—ORb / $C_6H_5$ / $C_6H_4$ / $C_6H_5$—Si—$C_6H_5$ / O / Rb |
| 5. $NH_4OH$ | $C_6H_5$ / $C_6H_5$ / $^+NH_4^-O$—Si—〈 〉—Si—O$^-NH_4^+$ / $C_6H_5$ / $C_6H_5$ / $C_6H_5$—Si—$C_6H_5$ / O / $^+NH_4$ |

Example 3

A solution of 102.1 g. (0.324 mol) of 1,3,5-tribromobenzene in 550 ml. of tetrahydrofuran was added slowly to a mixture of 244.5 g. (1 mol) of diphenylvinylchlorosilane, 30.4 g. (1.25 mols) of magnesium and 200 ml. of tetrahydrofuran. The reaction was exothermic. When the addition was complete, the reaction mixture was heated at reflux temperature for one hour. The reaction mixture was refluxed for an additional hour after the addition of 1,000 ml. of n-hexane. The mass was then cooled and the magnesium solids were filtered out. The organic layer was washed with water and the solvent separated by vacuum distillation. Strip distillation provided 75.8 percent theoretical yield of 1,3,5-tris(diphenylvinylsilyl)benzene.

Example 4

A solution of 2,4,6-tribromoanisole in 300 ml. of tetrahydrofuran was added slowly to a mixture of 110 g. (1.16 mols) of dimethylchlorosilane and 30 g. (1.22 mols) of magnesium and 200 ml. of tetrahydrofuran. The reaction was exothermic. When the addition was complete, the reaction mixture was heated at reflux temperature for 24 hours. The reaction mass was then cooled and the magnesium solids filtered out. The organic layer was washed with water and the solvent separated by vacuum distillation. A 45.4 percent theoretical yield of 2,4,6-tris-(dimethylhydrogensilyl)anisole was obtained.

The alkoxysilane, 2,4,6-tris(dimethylethoxysilyl)anisole was prepared by heating a mixture of 150 ml. of absolute ethanol and a small piece of metallic sodium at reflux temperature while 50.3 g. of 2,4,6-tris(dimethylhydrogensilyl)anisole was added slowly thereto. When the evolution of hydrogen had ceased, the entire reaction was added slowly with constant stirring to a mixture of 31.3 g. NaOH, 189 ml. of methanol and 21 ml. of $H_2O$. An additional 31.3 g. of NaOH in 210 ml. of water was added to the mass.

The reaction product had the formula

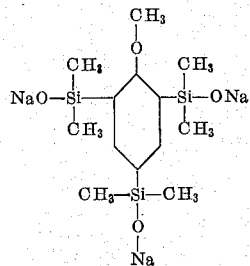

After standing overnight, the entire mixture (including the tris-sodium salt) was added to an ice water solution containing 278 g. of $KH_2PO_4$. A precipitate formed immediately and was removed by filtration and recrystallization from benzene. This provided the compound 2,4,6-tris(dimethylhydroxysilyl)anisole.

Example 5

A solution of eight drops of tetramethylguanidine-2-ethylhexoate in 180 ml. of benzene was added to 30 g. (0.02 mol) of a low molecular weight hydroxy-end-blocked dimethylpolysiloxane and 2 g. (0.0067 mol) of 1,3,5-tris(dimethylhydroxysilyl)benzene, and the mixture was added at 80° C. under reflux while water was removed by way of azeotrope trap. Refluxing was continued for about 60 hours to remove the theoretical quantity of water from the system. The benzene was then evaporated from the solution and a copolymer containing units of the formula

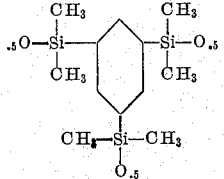

and units of the formula

was obtained.

After milling this copolymer, 5 parts by weight of ditertiarybutylperoxide was added and the mixture press-vulcanized at 12,000 p.s.i. at 175° C. for 30 minutes. A rubber was obtained.

Example 6

The following table lists the silanes, silane triols and siloxanes produced when the following organohalogenosilanes and tribromobenzenes are respectively substituted at the same mol ratios for the dimethylchlorosilane and the 1,3,5-tribromobenzene in the process of Example 1. The quantities of NaOH, water and methanol used to hydrolyze the alkoxysilanes must be doubled in the case of samples 6 and 9. The intermediate alkoxysilane is obtained in sample 9 without the necessity of reacting the silane product with ethanol and sodium. When any of the following silanols are substituted for the 1,3,5-tris(dimethylhydroxysilyl)benzene in the process of Example 5, the corresponding copolymers are produced.

TABLE I

| Organohalogenosilane | Tribromobenzene | Silane Product | Silanol | Siloxane |
|---|---|---|---|---|
| 1-($C_2H_5$)$_2$HSiCl | 1,3,5-tribromobenzene | [structure] | [structure] | [structure] |
| 2-($CH_3$)($C_{18}H_{37}$)HSiCl | 1,3,5-tribromobenzene | [structure] | [structure] | [structure] |

TABLE I—Continued

| Organohalogenosilane | Tribromobenzene | Silane Product | Silanol | Siloxane |
|---|---|---|---|---|
| 3-methylcyclohexylchlorosilane | 1,3,5-tribromobenzene | (structure) | (structure) | (structure) |
| 4-methylcyclohexenylchlorosilane | 1,3,5-tribromobenzene | (structure) | (structure) | (structure) |
| 5-$(C_6H_5CH_2)(CH_3)HSiCl$ | 1,3,5-tribromobenzene | (structure) | (structure) | (structure) |
| 6-$(CH_3)(C_2H_5O)HSiCl$ | 1,3,5-tribromobenzene | (structure) | (structure) | (structure) |
| 7-$(CH_3)(C_3H_7)SiHBr$ | 1,3,5-tribromobenzene | (structure) | (structure) | (structure) |

TABLE 1—Continued
| Organohalogenosilane | Tribromobenzene | Silane Product | Silanol | Siloxane |
|---|---|---|---|---|
| 8-(CH₃)(CH₂=CHCH₂)SiHCl | 1,3,5-tribromobenzene | 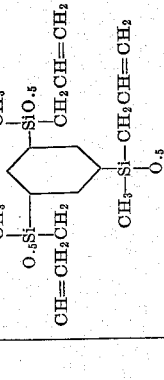 | 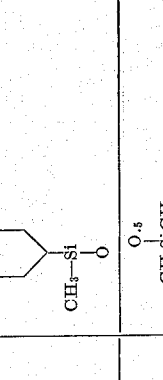 | 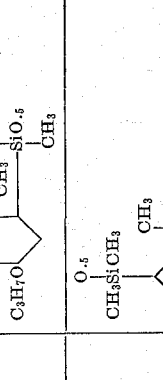 |
| 9-(CH₃O)₂(CH₃)SiCl | 1,3,5-tribromobenzene | 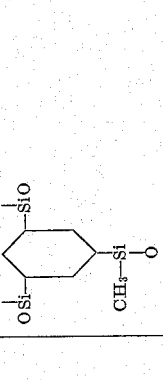 | 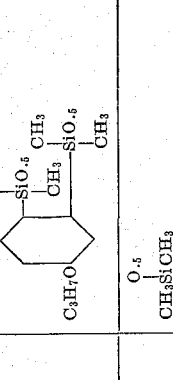 | |
| 10-(CH₃)₂SiHCl | 5-propoxy-1,2,3-tribromobenzene | 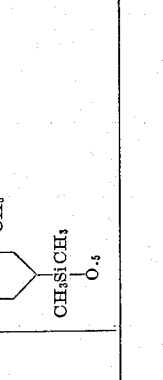 | 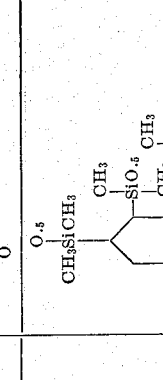 | 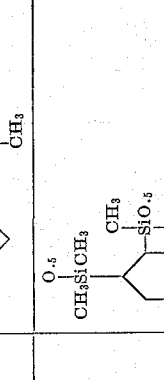 |
| 11-(CH₃)₂SiHCl | 1,2,4-tribromobenzene | 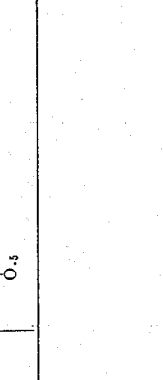 | 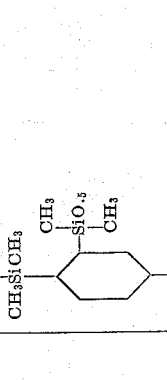 | |

Example 7

When the following siloxanes are substituted for the dimethylpolysiloxane in the process of Example 5, the following copolymers are produced.

TABLE II

| Siloxane | Units of Copolymer |
|---|---|
| 1-Low molecular weight hydroxy endblocked methylphenylpolysiloxane. | $O_{.5}$—Si(CH$_3$)$_2$—⌬(CH$_3$—Si(CH$_3$)—O$_{.5}$)—SiO$_{.5}$(CH$_3$)$_2$  and  SiO with CH$_3$, C$_6$H$_5$ |
| 2-HO(CH$_3$)$_2$Si—⌬—Si(CH$_3$)$_2$OH | $O_{.5}$—Si(CH$_3$)$_2$—⌬(CH$_3$—Si(CH$_3$)—O$_{.5}$)—SiO$_{.5}$(CH$_3$)$_2$ and $O_{.5}$(CH$_3$)$_2$Si—⌬—Si(CH$_3$)$_2$O$_{.5}$ |
| 3-HO(C$_6$H$_5$)$_2$Si—⌬—Si(C$_6$H$_5$)$_2$OH | $O_{.5}$—Si(CH$_3$)$_2$—⌬(CH$_3$—Si(CH$_3$)—O$_{.5}$)—SiO$_{.5}$(CH$_3$)$_2$ and $O_{.5}$(C$_6$H$_5$)$_2$Si—⌬—Si(C$_6$H$_5$)$_2$O$_{.5}$ |
| 4-Hydroxy-endblocked dimethylsiloxane-methylvinylsiloxane copolymer [99.5 mol percent (CH$_3$)$_2$SiO, 0.5 mol percent (CH$_3$)(CH$_2$=CH)SiO]. | $O_{.5}$—Si(CH$_3$)$_2$—⌬(CH$_3$—Si(CH$_3$)—O$_{.5}$)—SiO$_{.5}$(CH$_3$)$_2$ and SiO(CH$_3$)$_2$ and SiO with CH$_3$, CH=CH$_2$ |
| 5-Hydroxy endblocked monophenylsiloxane-dimethylsiloxane copolymer [30 mol percent (CH$_3$)$_2$SiO and 70 mol percent (C$_6$H$_5$)SiO$_{1.5}$]. | $O_{.5}$—Si(CH$_3$)$_2$—⌬(CH$_3$—Si(CH$_3$)—O$_{.5}$)—SiO$_{.5}$(CH$_3$)$_2$ and SiO(CH$_3$)$_2$ and C$_6$H$_5$SiO$_{1.5}$ |

Example 8

123 g. of dimethylchlorosilane (1.3 moles), 36.5 g. of magnesium turnings (1.5 moles), and 200 ml. of tetrahydrofuran were added to a flask equipped with a stirrer, thermometer, addition funnel, and condenser surmounted with a Drierite tube.

A slurry made of 102.5 g. of 1,2,4,5-tetrabromobenzene (0.26 mole; 1.04 equivalents) and 350 ml. of tetrahydrofuran was added to the flask over a one hour 22 minutes period, an exothermic reaction being noted.

The mixture was stirred and gently heated for 12 hours. After cooling, the magnesium salts were removed by filtration, and the tetrahydrofuran solvent was evaporated. About 300 ml. of n-hexane was then added, shaken, and washed with water. Evaporation of the hexane yielded crystals of a product having a melting point at 67–69° C.

The product was determined to be

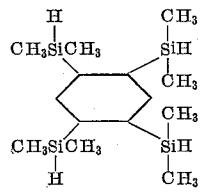

When the product is mixed with 5 times its weight of methanol and one weight percent of sodium metal, based on the weight of the product and is heated at reflux, the compound tetrakis(dimethylmethoxysilyl)benzene is produced.

When NaOH and water is added to this mixture (first removing any unreacted sodium), the sodium salt of the above material is produced having the formula:

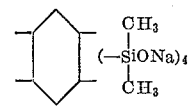

Example 9

43.8 g. of magnesium turnings (1.8 moles), 170.1 g. of dimethylchlorosilane (1.8 moles), and 750 ml. of tetrahydrofuran were placed in a flask equipped as in Example 8.

A slurry made of 150 g. of hexabromobenzene (0.27 mole; 1.62 equivalents) and 750 ml. of tetrahydrofuran was added to the flask.

The mixture was heated at 50° C. for 4 days, and then filtered after cooling. The liquid filtrate was extracted with toluene and then evaporated. The product was a yellow solid, which upon recrystallization from acetone had a melting point of 205 to 207.5° C.

Analysis showed the product to be hexakis(dimethylhydrogensilyl)benzene.

Example 10

When pentabromobenzene is substituted for hexabromobenzene in the reaction of Example 9, the product pentakis(dimethylhydrogensilyl)benzene is recovered.

That which is claimed is:

1. A compound of the formula $$R_nC_6H_{(6-m-n)}(SiR'R''_2)_m$$

wherein R is an alkoxy radical of from 1 to 3 carbon atoms, $n$ has a value of 0 to 1, R' is selected from the group consisting of hydrogen atoms and monovalent hydrocarbon, alkoxy, hydroxyl and —OM radicals, wherein M is selected from the group consisting of $NH_4^+$ ions and alkali metal, R'' is selected from the group consisting of monovalent hydrocarbon, alkoxy, hydroxyl and —OM radicals, and $m$ has a value of 3 to 6, an average of at least one R' and R'' group per molecule being selected from the group consisting of alkoxy, vinyl, hydroxyl and —OM radicals and hydrogen atoms.

2. The composition of claim 1 where $m$ is 3.
3. A compound of the formula

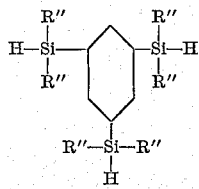

wherein R'' is a monovalent hydrocarbon radical.

4. 1,3,5-tris(phenylmethylhydrogensilyl) benzene.
5. 1,3,5-tris(dimethylhydrogensilyl)benzene.
6. 1,3,5-tris(diphenylhydrogensilyl)benzene.
7. 1,2,4,5-tetrakis(dimethylhydrogensilyl)benzene.
8. A compound of the formula

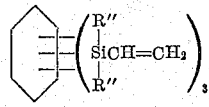

where R'' is a monovalent hydrocarbon radical.

9. 1,3,5-tris(dimethylvinylsilyl)benzene.
10. A compound of the formula

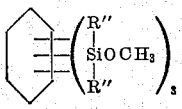

where R'' is a monovalent hydrocarbon radical.

11. A compound of the formula

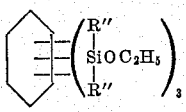

where R'' is a monovalent hydrocarbon radical.

12. An organosilicon polymer consisting essentially of units of the formula

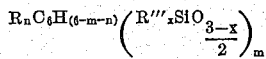

wherein R is an alkoxy radical of from 1 to 3 carbon atoms, $n$ has a value of 0 to 1, $x$ has a value of 1 to 2, R''' is a monovalent hydrocarbon radical, and $m$ has a value of 3 to 6.

13. An organosilicon polymer consisting essentially of units of the formula

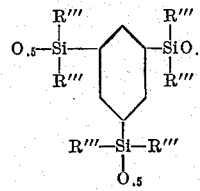

wherein R'' is a monovalent hydrocarbon radical, said polymer units being bonded together through SiOSi linkages.

14. The organosilicon polymer of claim 13 wherein R''' is phenyl.
15. The organosilicon polymer of claim 13 wherein R''' is methyl.
16. The organosilicon polymer of claim 13 wherein the R''' group are phenyl and methyl.
17. An organosiloxane copolymer consisting essentially of
   (1) units of the formula

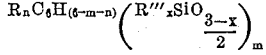

wherein
   R is an alkoxy radical of from 1 to 3 carbon atoms,
   $n$ has a value of 0 to 1, $x$ has a value of 1 to 2,
   R''' is a monovalent hydrocarbon radical, and $m$ has a value of 3 to 6, and
   (2) units selected from the group consisting of
   (A)

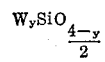

wherein W is selected from the group consisting of monovalent hydrocarbon radicals and halogenated monovalent hydrocarbon radicals, and $y$ has a value of 1 to 2,
   (B) —Si(W')$_2$W''(W')$_2$SiO—, wherein each W' is a monovalent hydrocarbon radical and W'' is a divalent radical selected from the group consisting of p-phenylene, 4,4'-biphenylene, 4,4'-phenylene ether, 4,4' - p - xylylene and 4,4' - diethylenediphenyl ether radicals, and
   (C) both (A) and (B) polymeric units,
said polymeric units being bonded together through SiOSi linkages.

18. An organosiloxane copolymer consisting essentially of
   (A) units of the formula

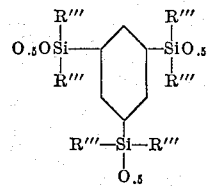

wherein R''' is a monovalent hydrocarbon radical, and
   (B) units of the formula

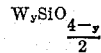

wherein W is a monovalent hydrocarbon radical and $y$ has a value of 1 to 2,
said (A) and (B) units being bonded together through SiOSi linkages.

19. The organosiloxane copolymer of claim 18 wherein R''' is methyl.
20. The organosiloxane copolymer of claim 18 wherein R''' is phenyl.
21. The organosiloxane copolymer of claim 18 wherein the R''' groups are methyl and phenyl.

References Cited by the Examiner

UNITED STATES PATENTS

| | | | |
|---|---|---|---|
| 2,739,638 | 3/1956 | Lewis et al. | 260—45.5 |
| 3,053,872 | 9/1962 | Omietanski | 260—448.2 |
| 3,150,115 | 9/1964 | Clark et al. | 260—46.5 |
| 3,202,634 | 8/1965 | Merker | 260—46.5 |
| 3,209,018 | 9/1965 | Merker | 260—46.5 |

LEON J. BERCOVITZ, *Primary Examiner.*

M. I. MARQUIS, *Assistant Examiner.*